UNITED STATES PATENT OFFICE.

EDWARD S. DAVIS, JR., OF MONTROSE, KANSAS.

CATTLE FOOD.

949,416.  Specification of Letters Patent.  Patented Feb. 15, 1910.

No Drawing.   Application filed July 3, 1909.  Serial No. 505,858.

*To all whom it may concern:*

Be it known that I, EDWARD S. DAVIS, Jr., a citizen of the United States, residing at Montrose, in the county of Jewell and State of Kansas, have invented certain new and useful Improvements in Cattle Food, of which the following is a specification, reference being had therein to the accompanying drawing.

This invention relates to a compound for preventing or minimizing the loss of flesh or "weight" of cattle and hogs in shipment.

My improved compound is fed to animals just before shipment, and I have found by experience that the food prevents scouring and shrinking in weight while the animals or stock are in transit.

The compound consists of 84% old processed flax-seed meal, 10% common salt, and 6% pulverized alum, thoroughly mixed, preferably, in a dry state or condition.

The compound is comparatively inexpensive to prepare, owing to the ingredients used, and yet a very valuable food is produced, which has stimulating or nutritious ingredients owing to the exact combination used.

From extensive experience with my improved food, I find that it is an "anti-shrink" food, because of the fact that the animals do not materially lose their weight in transit, as is usually the case, for it is well known that stock is often not fed or watered while confined in limited quarters, as box cars and stock yards.

By "old processed oil-meal," I refer to the meal that is made from flax-seed by grinding or pressing the oil from the seed, instead of extracting the oil by the use of acids; the use of acid in the extracting of the oil makes the meal or the by-product undesirable for a food. By means of this food compound "scouring of stock" during transportation is prevented. This "scouring" is caused by excitement of the stock in transit rendering them feverish and in many cases unfit for food when slaughtered.

What I claim as new and desire to secure by Letters Patent is:

1. A cattle food compound, consisting of 84% oil expressed flax-seed meal, as herein described, 10% common salt, and 6% pulverized alum.

2. An improved stock food compound, consisting of oil-expressed flax-seed meal, as herein set forth, pulverized alum, and common salt thoroughly mixed, substantially in the proportions described.

In testimony whereof I hereunto affix my signature in presence of two witnesses.

EDWARD S. DAVIS, JR.

Witnesses:
 I. E. GOOD,
 W. E. SILVIS.